(12) United States Patent
Kimura

(10) Patent No.: US 10,300,820 B2
(45) Date of Patent: May 28, 2019

(54) VEHICLE SEAT

(71) Applicant: TOYOTA BOSHOKU KABUSHIKI KAISHA, Aichi-ken (JP)

(72) Inventor: Koji Kimura, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 2 days.

(21) Appl. No.: 15/703,403

(22) Filed: Sep. 13, 2017

(65) Prior Publication Data

US 2018/0079340 A1 Mar. 22, 2018

(30) Foreign Application Priority Data

Sep. 21, 2016 (JP) .................................. 2016-183837

(51) Int. Cl.
*B60N 2/68* (2006.01)
(52) U.S. Cl.
CPC .................................... *B60N 2/686* (2013.01)
(58) Field of Classification Search
CPC ...................................................... B60N 2/686
See application file for complete search history.

(56) References Cited

U.S. PATENT DOCUMENTS

| | | | | |
|---|---|---|---|---|
| 4,493,505 A * | 1/1985 | Yamawaki | ........... | B60N 2/3013 296/63 |
| 6,688,700 B2 * | 2/2004 | Gupta | ................. | B29C 49/4802 297/232 |
| 6,739,673 B2 * | 5/2004 | Gupta | .................. | B60N 2/3013 297/232 |
| 6,742,847 B2 * | 6/2004 | Yanai | ................... | B60N 2/3013 297/216.13 |
| 6,981,748 B2 * | 1/2006 | Garnweidner | ....... | B60N 2/5825 297/218.1 |
| 7,422,289 B2 * | 9/2008 | Kim | ....................... | B60N 2/686 297/452.18 |
| 7,891,740 B2 * | 2/2011 | Boes | ...................... | B60N 2/686 297/452.14 |
| 8,789,400 B2 * | 7/2014 | Roszczenko | ............. | B60N 2/22 297/452.18 |
| 8,998,316 B2 * | 4/2015 | Naughton | ........... | B29C 47/0019 29/527.1 |

(Continued)

FOREIGN PATENT DOCUMENTS

JP 2003-237446 8/2003
JP 4146135 B2 6/2008

*Primary Examiner* — Philip F Gabler
(74) *Attorney, Agent, or Firm* — Greenblum & Bernstein, P.L.C.

(57) ABSTRACT

A vehicle seat including a panel frame including a fixed area, an overhang area, and a bead including a first bead piece extending across the overhang area and the fixed area from a position in a height direction closer to a first fixed point than a second fixed point toward the second fixed point, a second bead piece extending across the overhang area and the fixed area from a position in the height direction closer to the second fixed point than the first fixed point toward the first fixed point, and a third bead piece formed across the overhang area and the fixed area in a state of being provided between the first bead piece and the second bead piece and spaced apart from both the first bead piece and the second bead piece with a general surface provided therebetween.

3 Claims, 4 Drawing Sheets

(56) References Cited

U.S. PATENT DOCUMENTS

| | | | | |
|---|---|---|---|---|
| 9,452,693 B2* | 9/2016 | Gardner | ............... | B60N 2/24 |
| 2018/0079339 A1* | 3/2018 | Kimura | ............... | B60N 2/686 |
| 2018/0079340 A1* | 3/2018 | Kimura | ............... | B60N 2/686 |

* cited by examiner

VEHICLE SEAT

CROSS-REFERENCE TO RELATED APPLICATIONS

This application claims priority from Japanese Patent Application No. 2016-183837 filed on Sep. 21, 2016, the entire contents of which are incorporated herein by reference.

TECHNICAL FIELD

The disclosure relates to a vehicle seat, and particularly, to a vehicle seat that includes a panel frame constituting a framework of a seat back.

BACKGROUND

A rear seat of an automobile is known in which a frame of a seat back includes a panel frame fixedly installed on a partition panel of a vehicle body (Japanese Patent No. 4146135). The panel frame is integrally fixed in such a way that two left and right portions on the lower end side and one central portion on the upper end side are respectively bolted on the partition panel. A bead of a drawn shape for enhancing rigidity against bending and torsion of a panel surface is formed over a wide extension range of the panel surface of the panel frame.

However, in the above related art, when any load acting portion such as an operation lever or a headrest support portion is set in either a left shoulder portion or a right shoulder portion on the upper end side of the panel frame, a load inputted from the load acting portion causes an overload at a position on a line connecting upper and lower fixed points of the panel frame that supports the same load as a cantilever load. Thus, there is a possibility that the panel frame is deformed into a bent shape.

SUMMARY

An object to be achieved by the disclosure is to optimize the shape of the bead of the panel frame.

According to an aspect of the disclosure, there is provided a vehicle seat including: a vehicle main body; and a panel frame forming a framework of a seat back, the panel frame including: a first fixed point at which the panel frame is fixed to the vehicle main body at a first position in a height direction, and a second fixed point at which the panel frame is fixed to the vehicle main body at a second position in the height direction, the second position being different from the first position in the height direction; a fixed area which is one area of the panel frame partitioned by a line segment connecting the first fixed point and the second fixed point and includes a third fixed point at which the fixed panel is fixed to the vehicle main body at a position different from positions of the first fixed point and the second fixed point; an overhang area which is another area of the panel frame partitioned by the line segment and overhangs in a cantilevered manner without being fixed to the vehicle main body; a load input point which is in the overhang area and to which a load in an out-of-plane direction is configured to be applied; and a bead having a drawn shape for enhancing surface rigidity of the panel frame, wherein the bead includes: a first bead piece extending across the overhang area and the fixed area from a position in the height direction closer to the first fixed point than the second fixed point toward the second fixed point; a second bead piece extending across the overhang area and the fixed area from a position in the height direction closer to the second fixed point than the first fixed point toward the first fixed point; and a third bead piece formed across the overhang area and the fixed area in a state of being provided between the first bead piece and the second bead piece and spaced apart from both the first bead piece and the second bead piece with a general surface provided therebetween.

DETAILED DESCRIPTION

Hereinafter, embodiments for carrying out the disclosure will be described with reference to the drawings.

[First Embodiment]

Figure 1:
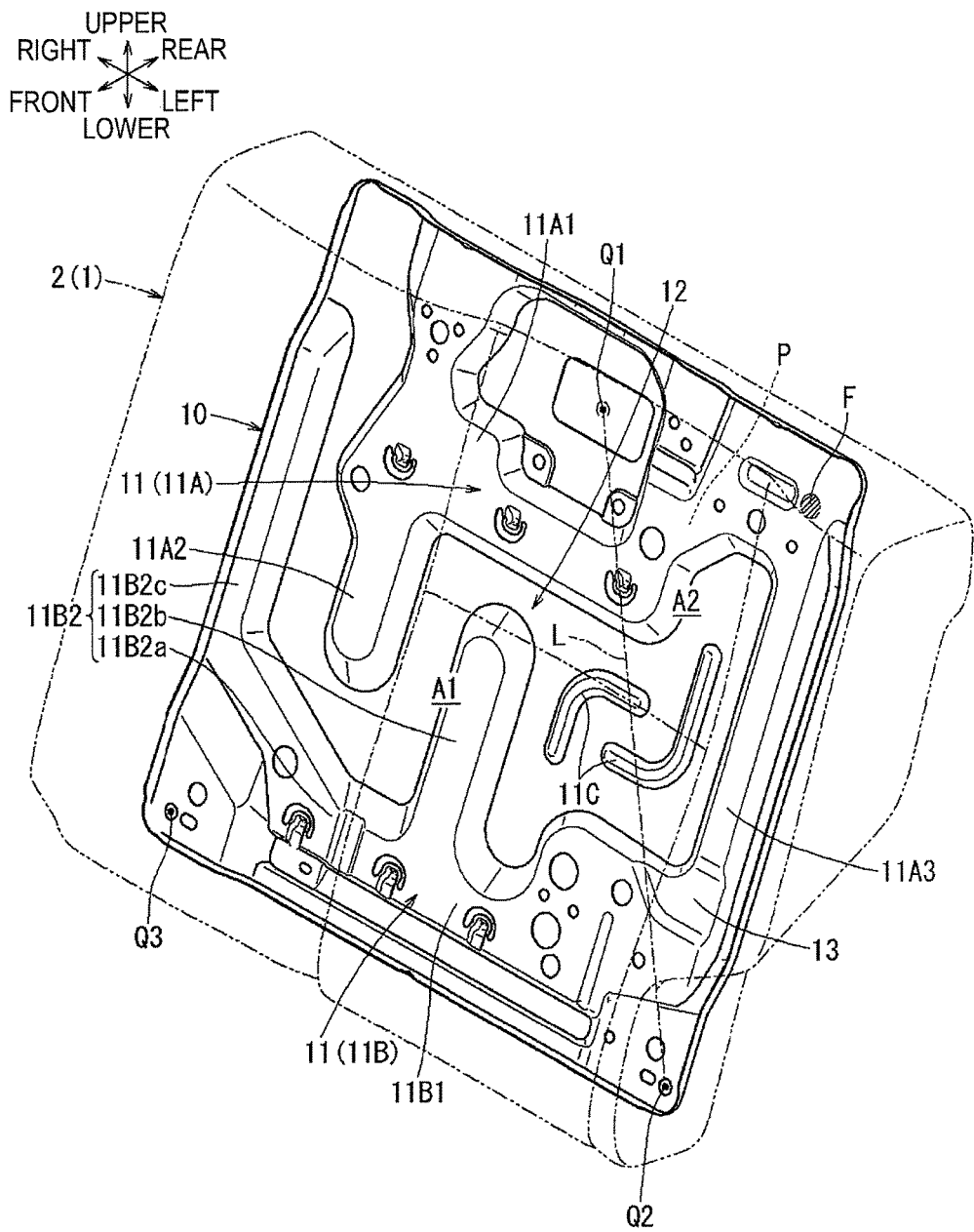
FIG. 1 is a perspective view showing a structure of a main part of a vehicle seat according to a first embodiment.

First, a configuration of a seat 1 (vehicle seat) according to a first embodiment will be described with reference to FIGS. 1 to 4. In the following description, the directions such as a front and rear direction, an upper and lower direction, and a right and left direction refer to the respective directions as indicated in each of the drawings. As shown in FIG. 1, the seat 1 of the present embodiment is configured as a rear seat of an automobile and includes a seat back 2 serving as a backrest of a seated occupant and a seat cushion (not shown) serving as a seating part. The above-described seat 1 is configured as a dividing seat on the wide side of a bench seat on which three persons can sit and which is divided in a ratio of 6:4 in a width direction.

Figure 2:
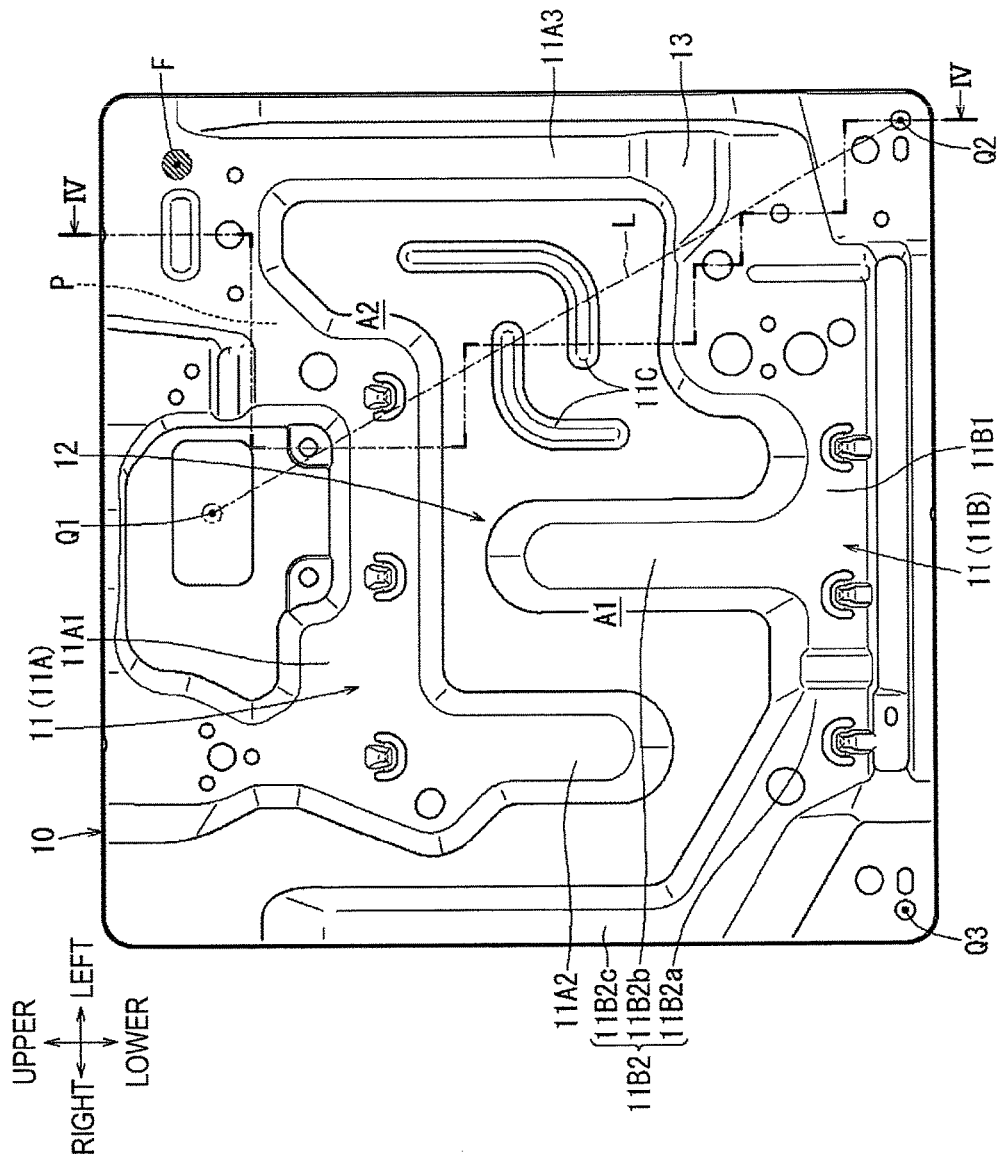
FIG. 2 is a front view of a panel frame.

An internal framework of the seat back 2 of the seat 1 includes a panel frame 10 made of a single metal panel. As shown in FIGS. 1 and 2, the panel frame 10 is set and mounted, from the front, on a partition panel P (specific illustration is omitted) of a vehicle body positioned on the back side of the panel frame 10. Specifically, the above-described panel frame 10 is installed as a state in which a substantially central portion (upper fixed point Q1) in the width direction of its upper end-side region and both end portions (lower fixed points Q2, Q3) in the width direction of its lower end-side region are integrally fixed by being respectively bolted on the above-described partition panel P of the vehicle body. Here, the above-described partition panel P corresponds to the "vehicle main body" of the disclosure.

Figure 3:
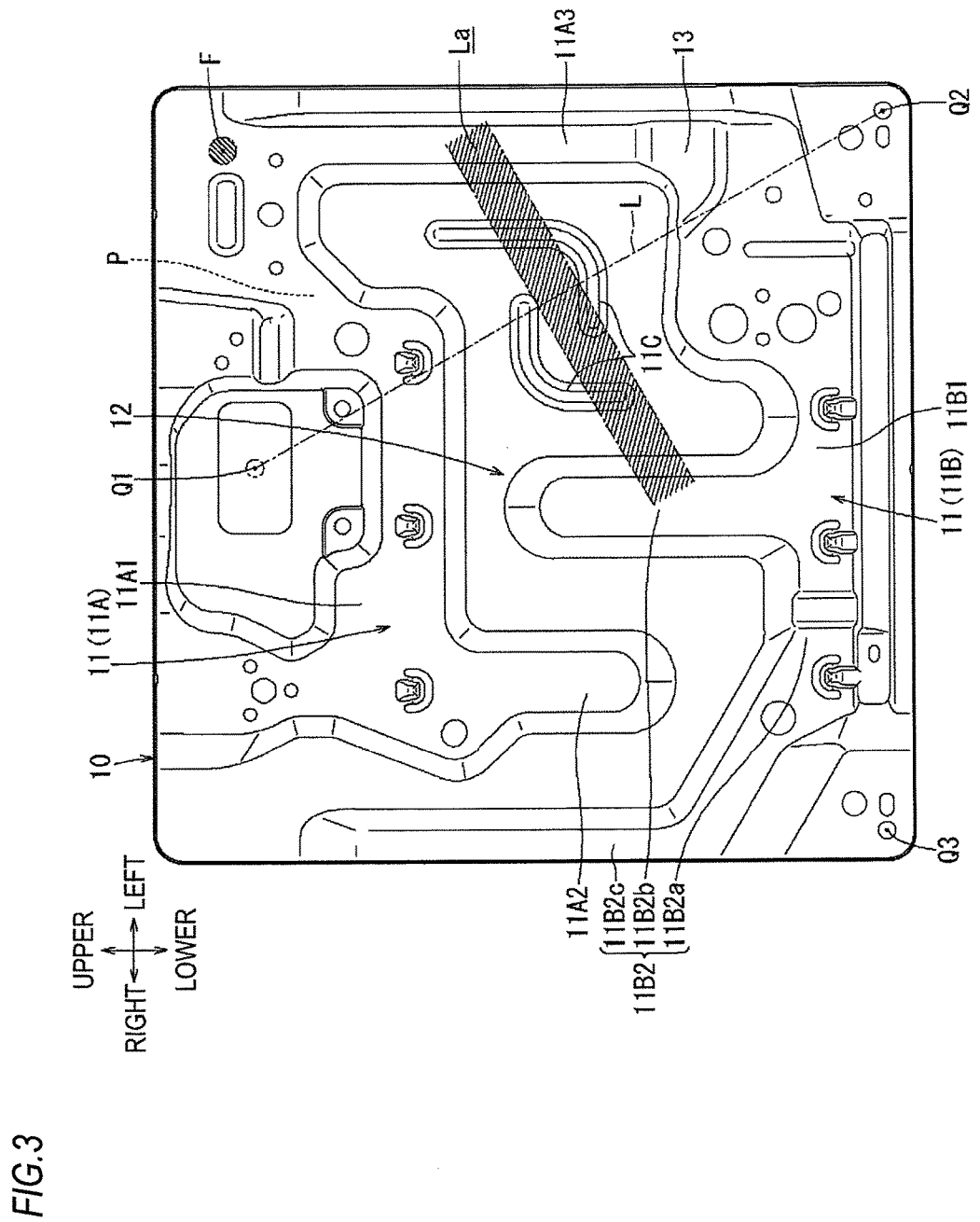
FIG. 3 is a schematic view showing each fixed point and a load input point of the panel frame.

With the above fixation, the panel frame 10 is installed as a state in which a back pad (not shown) set on the front surface of the panel frame 10 can be widely surface-supported from the back side. For details, as shown in FIG. 3, with the above fixation, a right area of the panel frame 10 partitioned by a line segment L connecting the upper fixed point Q1 and the right lower fixed point Q2 is configured as a fixed area A1 that is fixedly provided in a state of being completely constrained on the partition panel P of the vehicle body by the above-described right lower fixed point Q3. Further, with the above fixation, a left area of the panel frame 10 partitioned by the line segment L is configured as an overhang area A2 that overhangs in a cantilevered manner toward the left upper side without being fixed on the partition panel P of the vehicle body.

Since the overhang area A2 is supported in a cantilevered manner, the overhang area A2 is provided in a state of being likely to be bent in the front and rear direction, as compared with the above-described fixed area A1. Here, the upper fixed point Q1 and the left lower fixed point Q2 described above respectively correspond to the "first fixed point" and "the second fixed point" of the disclosure, and the right lower fixed point Q3 corresponds to "the third fixed point" of the disclosure.

A load input point F is set at a left shoulder portion of the panel frame 10 located in the above-described overhang area A2. A load in the front and rear direction (in the out-of-plane direction) may be applied to the load input point F by a force acting on a headrest or any lever (not shown) attached to the shoulder portion. Meanwhile, the position of the load input point F may be set to any position in the overhang area A2, and the position shown in FIG. 3 is just a specific example thereof.

The above-described panel frame 10 is formed in a substantially flat plate shape having a substantially rectangular shape as seen in a front view. However, beads 11 that form a drawn shape for enhancing the surface rigidity (rigidity against bending and torsion) of the panel frame 10 are formed at several portions of the panel frame 10. The above-described beads 11 generally include a first bead piece 11A formed in an upper region of the panel frame 10, a second bead piece 11B formed in a lower region of the panel frame 10, and two third bead pieces 11C formed in a state of being separated in a floating island shape between the first bead piece 11A and the second bead piece 11B.

Figure 4:
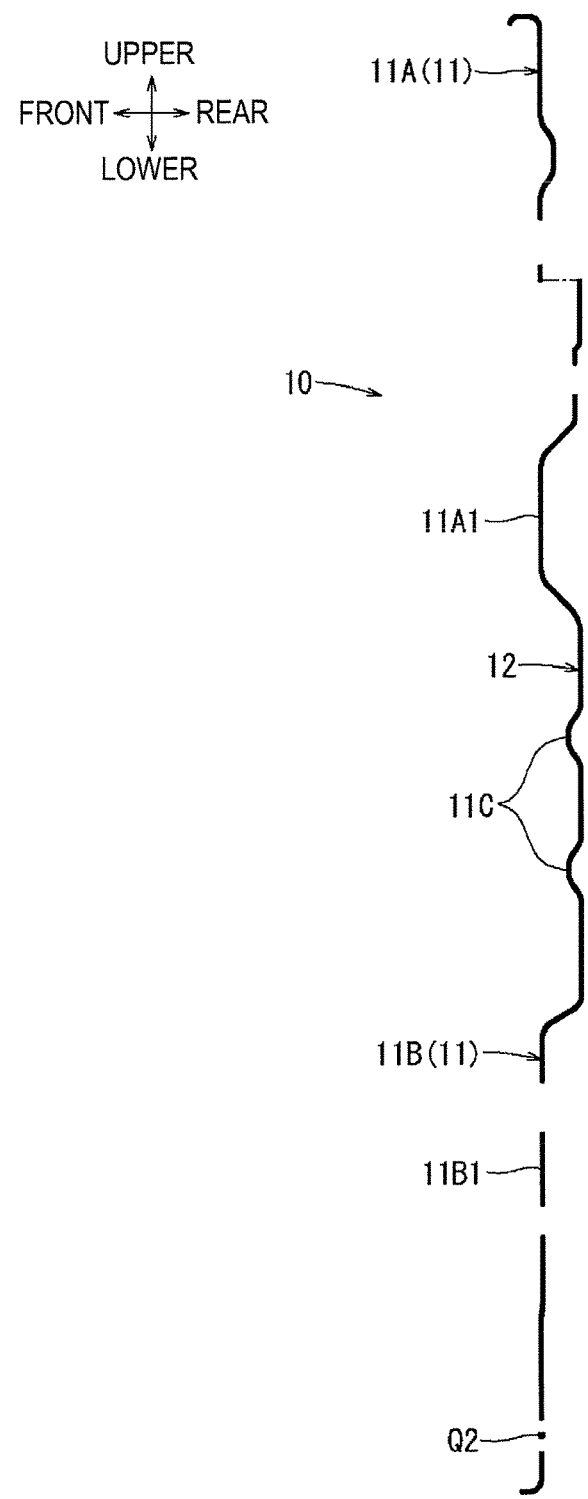
FIG. 4 is a sectional view taken along the line IV-IV shown in FIG. 2.

The first bead piece 11A and the second bead piece 11B described above are respectively formed so as to be drawn in a shape of bulging forward from a general surface 12 at the same bulging height with respect to the general surface 12 of the panel frame 10 (see FIG. 4). On the contrary, the above-described third bead piece 11C is formed so as to be drawn in a shape of bulging forward from the general surface 12 at the bulging height lower than the first bead piece 11A and the second bead piece 11B described above.

Specifically, as shown in FIGS. 2 and 3, the above-described first bead piece 11A is formed in a shape of continuously having a body shaped portion 11A1, an entry shaped portion 11A2, and a peripheral shaped portion 11A3. The body shaped portion 11A1 extends downward from a substantially upper edge portion of the panel frame 10 with a wide lateral width over the fixed area A1 that is a right area of the upper fixed point Q1 and the overhang area A2 that is a left area thereof. The entry shaped portion 11A2 partially extends long downward from the right end portion of the body shaped portion 11A1. The peripheral shaped portion 11A3 partially extends long downward along the left edge portion of the panel frame 10 from the left end portion of the body shaped portion 11A 1. The above-described entry shaped portion 11A2 is shaped so as to extend downward beyond an intermediate area in the width direction without going through the right edge portion of the panel frame 10. Due to the extension to the lower side, the above-described body shaped portion 11A1 has a shape which is close to the lower fixed point Q2 in the height direction on the line segment L over the fixed area A1 and the overhang area A2 from the above-described upper fixed point Q1 but does not reach a lower edge portion of the panel frame 10.

On the other hand, the second bead piece 11B is formed in a shape of continuously having a body shaped portion 11B1 and a U-shaped portion 11B2. The body shaped portion 11B1 extend upward from a substantially lower edge portion of the panel frame 10 with a wide lateral width over most of the region between the left and right lower fixed points Q2, Q3. The U-shaped portion 11B2 extends upward in a U shape from the right end portion of the body shaped portion 11B1. The left end-side shape portion of the above-described body shaped portion 11B1 extends up to the left edge portion of the panel frame 10 at the position above the respective lower fixed points Q2, Q3 from the substantially lower edge portion of the above-described panel frame 10. Thus, the body shaped portion 11B1 is shaped to be connected to a lower end portion of the peripheral shaped portion 11A3 of the above-described first bead piece 11A by a connection portion 13 of a bead shape which has a bulging height different from (lower than) the lower end portion.

Further, the U-shaped portion 11B2 is formed in a U shape in which a right end-side shape portion of the above-described body shaped portion 11B1 is defined as a bottom side portion 11B2a, and rising side portions 11B2b, 11B2c are respectively extended upward along a substantially central portion in the width direction and a right edge portion of the panel frame 10. Specifically, the U-shaped portion 11B2 is shaped in such a way that the rising side portion 11B2b extending upward along the substantially central portion in the width direction of the panel frame 10 does not extend up to the position where it hits against the body shaped portion 11A1 of the above-described first bead piece 11A in the height direction, and the general surface 12 is formed between the body shaped portion 11A1 and the rising side portion 11B2b. Further, the U-shaped portion 11B2 is shaped in such a way that, from the position of extending rightward and upward obliquely from the right end of the bottom side portion 11B2a and reaching a right edge portion of the panel frame 10, the rising side portion 11B2c extending upward along the right edge portion of the panel frame 10 extends straightly upward along the right edge portion of the panel frame 10.

Due to the extension to the upper side, the above-described body shaped portion 11B1 has a shape which is close to the upper fixed point Q1 in the height direction on the line segment L over the fixed area A1 and the overhang area A2 from the above-described left lower fixed point Q2 but does not reach an upper edge portion of the panel frame 10. With the above configuration, in the panel frame 10, the body shaped portion 11A 1 of the first bead piece 11A extending toward the left lower fixed point Q2 from the upper fixed point Q1, and the body shaped portion 11B1 of the second bead piece 11B extending toward the upper fixed point Q1 from the left lower fixed point Q2 are formed on the above-described line segment L so as to be separated from each other in a state where the general surface 12 is provided therebetween.

In the body shaped portion 11A1 of the first bead piece 11A and the body shaped portion 11B1 of the second bead piece 11B located on the above-described line segment L, the length of the general surface 12 formed therebetween can be shortened by increasing the extending length of each other toward the other side. However, as the extending length of the respective body shaped portions 11A1, 11B1 toward the other side is increased, a decrease in rigidity is caused due to the expansion of the bead surfaces. Therefore, in the region where the general surface 12 is formed between the body shaped portion 11A1 of the first bead piece 11A and the body shaped portion 11B1 of the second bead piece 11B, two third bead pieces 11C forming a floating island-like bead shape in a form separated from the first bead piece 11A and the second bead piece 11B are formed.

Each of the above-described third bead pieces 11C has a substantially L-shaped bead shape extending in the width direction and the height direction and is in a state of being aligned so as to face each other's L shape. Specifically, the third bead pieces 11C are oriented such that each other's L shape is twice symmetric. Therefore, bead shapes extending in the width direction of each other face each other with a space in the height direction, and bead shapes extending in the height direction of each other also face each other with a space in the width direction. Further, the third bead pieces 11C are arranged such that the bead shapes extending in the width direction thereof are respectively located on the line segment L. Thus, the third bead pieces 11C extend across the overhang area A2 and the fixed area A1. More specifically, the third bead pieces 11C are provided such that the bead shapes extending in the height direction thereof are located in the orthogonal area La which is an area orthogonal to a portion of the line segment L running between the third bead pieces 11C (see FIG. 3).

With the above configuration, in the panel frame 10, the first bead piece 11A, the second bead piece 11B and the third bead pieces 11C extending across the above-described line segment L suitably suppresses the overhang area A2 from being bent with the line segment L serving as a fulcrum of the cantilever as a bent line due to the load in the front and rear direction (out-of-plane direction) inputted from the load input point F. For details, the third bead pieces 11C are provided in a state of extending in the orthogonal area La of the line segment L. Therefore, when the load is inputted as described above, in the panel frame 10, the region between the third bead pieces 11C is also appropriately suppressed from being bent in a manner of having a bent line along the orthogonal area La of the line segment L.

To summarize the above, the seat 1 of the present embodiment is configured as follows. That is, the vehicle seat (seat 1) includes a vehicle main body (partition panel P) and a panel frame (panel frame 10) forming a framework of a seat back (seat back 2). The panel frame (panel frame 10) includes a first fixed point (upper fixed point Q1) at which the panel frame (panel frame 10) is fixed to the vehicle main body (partition panel P) at a first position in a height direction, and a second fixed point (lower fixed point Q2) at which the panel frame (panel frame 10) is fixed to the vehicle main body (partition panel P) at a second position in the height direction, the second position being different from the first position in the height direction, a fixed area (fixed area A1) which is one area of the panel frame (panel frame 10) partitioned by as line segment (line segment L) connecting the first fixed point (upper fixed point Q1) and the second fixed point (lower fixed point Q2) and includes a third fixed point (lower fixed point Q3) at which the panel frame (panel frame 10) is fixed to the vehicle main body (partition panel P) at a position different from positions of the first fixed point (upper fixed point Q1) and the second fixed point (lower fixed point Q2), an overhang area (overhang area A2) which is another area of the panel frame (panel frame 10) partitioned by the line segment (segment L) and overhangs in a cantilevered manner without being fixed to the vehicle main body (partition panel P), a load input point (load input point F) which is in the overhang area (overhang area A2) and to which a load in an out-of-plane direction (front and rear direction) is configured to be applied, and a bead (bead 11) having a drawn shape for enhancing surface rigidity of the panel frame (panel frame 10).

The bead (bead 11) includes a first bead piece (first bead piece 11A) extending across the overhang area (overhang area A2) and the fixed area (fixed area A1) from a position in the height direction closer to the first fixed point (upper fixed point Q1) than the second fixed point (lower fixed point Q2) toward the second fixed point (lower fixed point Q2), a second bead piece (second bead piece 11B) extending across the overhang area (overhang area A2) and the fixed area (fixed area A1) from a position in the height direction closer to the second fixed point (lower fixed point Q2) than the first fixed point (upper fixed point Q1) toward the first fixed point (upper fixed point Q1), and a third bead piece (third bead piece 11C) formed across the overhang area (overhang area A2) and the fixed area (fixed area A1) in a state of being provided between the first bead piece (first bead piece 11A) and the second bead piece (second bead piece 11B) and spaced apart from both the first bead piece (first bead piece 11A) and the second bead piece (second bead piece 11B) with a general surface (general surface 12) provided therebetween.

With such a configuration, the bead (bead 11) formed to the panel frame (panel frame 10) suitably suppresses the overhang area (overhang area A2) from being bent with the line segment (line segment L) connecting the fixed points (upper fixed point Q1 and lower fixed point Q2) serving as a fulcrum of the cantilever as a bent line due to the load in the out-of-plane direction (front and rear direction) inputted from the load input point (load input point F). For details, the bead (bead 11) is configured such that the third bead piece (third bead piece 11C) is formed in a floating island shape between the first bead piece (first bead piece 11A) and the second bead piece (second bead piece 11B) across the overhang area (overhang area A2) and the fixed area (fixed area A1) of the panel frame (panel frame 10). In this way, even when the first bead piece (first bead piece 11A) and the second bead piece (second bead piece 11B) are appropriately middle-terminated to form a shape that is not very long, the surface rigidity of the same region can be appropriately enhanced because the third bead piece (third bead piece 11C) is formed in a floating island shape at a part of the general surface (general surface 12) formed between the first and second bead pieces and the third bead piece. In this way, it is possible to optimize the shape of the bead (bead 11) of the panel frame (panel frame 10).

Further, the third bead piece (third bead piece 11C) includes a plurality of third bead pieces which are located on the line segment (line segment L) with a gap therebetween. With such a configuration, the surface rigidity of the region between the first bead piece (first bead piece 11A) and the second bead piece (second bead piece 11B) can be more appropriately enhanced.

Further, the plurality of third bead pieces (third bead pieces 11C) located on the line segment (line segment L) is formed so as to overlap with each other in both the height direction and a width direction. With such a configuration, the surface rigidity of the region between the first bead piece (first bead piece 11A) and the second bead piece (second bead piece 11B) can be more appropriately enhanced.

Although the embodiments of the disclosure have been described above using one embodiment, the disclosure can be implemented in various forms other than the above embodiment. For example, the "vehicle seat" of the disclosure can be widely applied not only to a seat other than a rear seat of an automobile, but also to a seat of a vehicle other than an automobile, such as a train, or a seat provided to another vehicle such as an aircraft or a ship.

Further, the first fixed point and the second fixed point for fixing two portions in the height direction of the panel frame to the vehicle main body is not necessarily set at the end portions in the height direction of the panel frame, but may be set at an intermediate portion such as a central portion.

Further, the third fixed point which is different from the first fixed point and the second fixed point and is for constituting the fixed area is not necessarily set at a position aligned with one of the first fixed point and the second fixed point in the width direction, but may be set at a height portion between the first fixed point and the second fixed point. Further, the third fixed point may be set at a plurality of portions.

Further, the third bead piece may be composed of one piece, instead of a plurality of pieces. Further, the third bead piece may have a bead shape that bulges at the same bulging height as the first or second bead piece. The shape of the third bead piece is determined according to the shape between the first bead piece and the second bead piece, and s specific shape of the third bead piece is not limited to a particular shape.

Further, in the above embodiment, a configuration has been exemplified in which the panel frame is fixed to the vehicle main body at one upper portion and two lower portions, and thus, the load input point is set in the upper shoulder tip. However, the panel frame may be fixed to the vehicle main body at two upper portions and one lower portion, and thus, the load input point may be formed in the lower end region where the overhang area is formed. The line segment connecting the first fixed point and the second fixed point may be set so as to extend straightly in the height direction.

What is claimed is:

1. A vehicle seat comprising:
    a panel frame forming a framework of a seat back, the panel frame including:
        a first fixed point at which the panel frame is fixed to a vehicle main body at a first position in a height direction, and a second fixed point at which the panel frame is fixed to the vehicle main body at a second position in the height direction, the second position being different from the first position in the height direction;
        a fixed area which is one area of the panel frame partitioned by a line segment extending through the first fixed point and the second fixed point and includes a third fixed point at which the fixed panel is fixed to the vehicle main body at a position different from positions of the first fixed point and the second fixed point;
        an overhang area which is another area of the panel frame partitioned by the line segment and extends in a cantilevered manner without being fixed to the vehicle main body;
        a load input point which is in the overhang area and to which a load in an out-of-plane direction is configured to be applied; and
        a bead having a drawn shape for enhancing surface rigidity of the panel frame,
    wherein the bead includes: a first bead piece extending across the overhang area and the fixed area from a position in the height direction closer to the first fixed point than the second fixed point toward the second fixed point; a second bead piece extending across the overhang area and the fixed area from a position in the height direction closer to the second fixed point than the first fixed point toward the first fixed point; and a third bead piece formed across the overhang area and the fixed area in a state of being provided between the first bead piece and the second bead piece and spaced apart from both the first bead piece and the second bead piece with a general surface provided therebetween.

2. The vehicle seat according to claim 1, wherein the third bead piece includes a plurality of third bead pieces which are located on the line segment with a gap therebetween.

3. The vehicle seat according to claim 2, wherein the plurality of third bead pieces located on the line segment is formed so as to overlap with each other in both the height direction and a width direction.

* * * * *